United States Patent [19]

Jacksch et al.

[11] 4,088,220
[45] May 9, 1978

[54] ENDLESS CONVEYORS FOR THE HORIZONTAL ROTARY CONVEYANCE OF OBJECTS

[75] Inventors: Bruno Jacksch, Wiesbaden-Dotzheim; Karl Müller, Hallgarten, both of Germany

[73] Assignee: W. & M. Automation Karl Muller, Nordenstadt, Germany

[21] Appl. No.: 687,709

[22] Filed: May 19, 1976

[30] Foreign Application Priority Data

May 20, 1975 Germany .............................. 2522299

[51] Int. Cl.² ............................................ B65G 17/00
[52] U.S. Cl. .................................... 198/472; 198/343; 198/793
[58] Field of Search ............... 198/339, 343, 345, 491, 198/580, 648, 472, 680, 779, 793, 794, 795; 104/172 B, 172 BT, 172 S, 252

[56] References Cited

U.S. PATENT DOCUMENTS

| Re. 25,886 | 10/1965 | Cargill | 198/472 |
| 2,548,131 | 4/1951 | Stern | 198/472 |
| 2,777,566 | 1/1957 | King | 198/779 |
| 3,043,237 | 7/1962 | McKee | 104/172 BT |
| 3,319,765 | 5/1967 | Hasenwinkle et al. | 198/460 |
| 3,338,382 | 8/1967 | Fogg | 198/794 |
| 3,476,231 | 11/1969 | Bower | 198/345 |
| 3,545,933 | 12/1970 | Podschadly et al. | 198/339 |
| 3,858,707 | 1/1975 | Block et al. | 198/345 |
| 3,934,701 | 1/1976 | Mooney et al. | 198/648 |
| 3,949,859 | 4/1976 | Nussbaumer et al. | 198/648 |

Primary Examiner—Evon C. Blunk
Assistant Examiner—Richard K. Thomson
Attorney, Agent, or Firm—George E. Kersey

[57] ABSTRACT

An endless conveyor having two adjacent, aligned, parallel chain loops each having two rectilinear portions. Between the loops and entrained by friction are suspended carrier members for carrying objects along the two rectilinear conveying tracks defined by the chains. A latching device comprising a spring-loaded, U-shaped member which wedges between spaced chain links thereby preventing sliding of the carrier members at the loop ends is provided to allow passage from one track to the other.

10 Claims, 4 Drawing Figures

A-A

ENDLESS CONVEYORS FOR THE HORIZONTAL ROTARY CONVEYANCE OF OBJECTS

The invention relates to endless conveyors for the horizontal rotary conveyance of objects.

Such conveyor devices are used for example for movement of workpieces from one production stage to a following one, it being essential that the conveyor device permit an accumulation of incoming carriers which can arise through the workpieces being removed at varying intervals of time. Accordingly it must also be possible to handle such an accumulation of returning carriers when the rate of loading of the carriers at the start of the conveyor device is slower than the rate of arrival of the carriers. Here the formation of an accumulation is made possible at any time through the carriers being entrained by the respective conveyors by friction alone so that when a carrier is stopped by an arresting means, acting from outside the conveyor in question, it slides along the carrier. Then if further carriers are brought up an accumulation of carriers forms in front of the arrested carrier.

As a result of the use of carriers, it is possible to convey objects of various sizes and shapes. Thus it is also possible, for instance, to employ the conveyor device for the movement of items of luggage, parcels, freight and the like.

Such conveyor devices have already been made with roller conveyors so that two such roller conveyors are disposed one above another, the upper one handling the outward trip and the rear one the return trip. When the rollers revolve they move carriers lying thereon forwards, it being ensured by means of friction between the rollers and their drive that the carriers and with them the rollers can be stopped thereby permitting the formation of an accumulation.

At the ends of the two roller conveyors separate lifting devices are provided which effect the transfer of the carriers from the upper roller conveyor to the lower roller conveyor and vice versa. With such roller conveyors, the rollers themselves, and above all, their mounting, represent considerable expenditure to which must still be added the cost for one lifting device for each conveyor, these lifting devices each needing their own control system to pick out the frontmost carrier from an accumulation thereof and transfer it to the other conveyor.

Another known conveyor device of the type named at the start consists of two pairs of chains, one pair forming the upper conveyor and the other pair the lower conveyor. Here the carriers lie with their edges on the chains of one pair are are moved along by the chains by friction. In the event of a carrier being stopped the chain then slides past under it. The transfer from the upper pair of chains to the lower pair of chains is effected as in the case of the known conveyor device described previously by means of one lifting device with its associated control system for each.

With the two known conveyor devices dealt with above it is still essential that both the upper conveyor and the lower conveyor thereof each have their own drive, in addition to which their two lifting devices also have their own separate drives.

An object of the invention is to reduce the expenditure for drive and control units and for the lifting devices. According to the invention, there is provided an endless conveyor comprising: an endless chain forming a loop having two substantially rectilinear portions; two end units disposed at respective ends of the loop for supporting and permitting motion of the chain; a plurality of carrier members for carrying respective articles and being slidably mounted on the chain in such manner as to be transported by friction contact with the chain; and latching means provided for each carrier member and arranged to latch onto the chain in order to prevent relative sliding of its associated carrier member and the chain when the carrier member passes from one rectilinear portion of the chain to the other.

Thus the conveyor provides an upper and a lower conveyor with only one common drive. In addition the otherwise necessary lifting devices are now included in the chain in that the end units are utilised as lifting means. The utilization of the end units in this way is made possible by the fact that the carrier members are equipped with latching means which only become effective in the vicinity of the end units. Moreover the carrier members are each suspended in such manner that in the area of the lower conveyor the carrier members are also carried along by the chains by friction alone.

Carrier members can form an accumulation at the end of both the upper and the lower conveyor since the chain only moves the carriers by friction in each case so that when a carrier member stops the chain slides by under the carrier. When the carrier members come into the vicinity of either end unit they are moved along here under the influence of the latching means so that at both ends of the conveyor they are transferred from one rectilinear portion to the other (i.e. from the upper conveyor to the lower conveyor or vice versa).

In one embodiment of the invention, each end unit comprises a sprocket wheel engaging the chain and each latching means comprises a separate elongate member disposed longitudinally of the chain and resiliently mounted on its carrier member so that as the elongate member passes with its carrier member from one said rectilinear portion to the other over either sprocket wheel the elongate member engages chordwise with that section of the chain engaging that sprocket wheel. This effect is important above all at the end where the transfer from the lower conveyor to the upper conveyor takes place as here when elongate member engages with the chain the weight of the carrier member has to be overcome, it being possible for the latter to slip back over the chain should it not immediately bear against the turn chain on reaching the relevant end unit. This occurs through the rails being pressed away from the carrier as soon as they run into the end unit in question.

According to a further embodiment of the invention, the latching means are constituted by ratchets provided on respective carrier members and arranged to engage the chain when respective carrier members pass from one said rectilinear portion to the other. By means of these ratchets the connections between carrier members and chain are made such that the carriers have to follow the chain in the area of the end units.

To operate the ratchet a control rail can be provided which disengages the ratchet from the chain in said rectilinear portions and allows the ratchet to engage in the chain in the respective vicinities of the end units. It is also possible to make the ratchets self-locking and individually switched over by switching elements at respective end regions of said rectilinear portions. In this way the operation of the ratchets is automated so that they only engage in the chain in the area of the end units.

Preferably, there are provided two adjacent endless chains disposed in parallel alignment and between which the carrier members are suspended.

For a better understanding of the invention and to show how the same may be carried into effect, reference will now be made, by way of example, to the accompanying drawings, in which.

Figure 1:
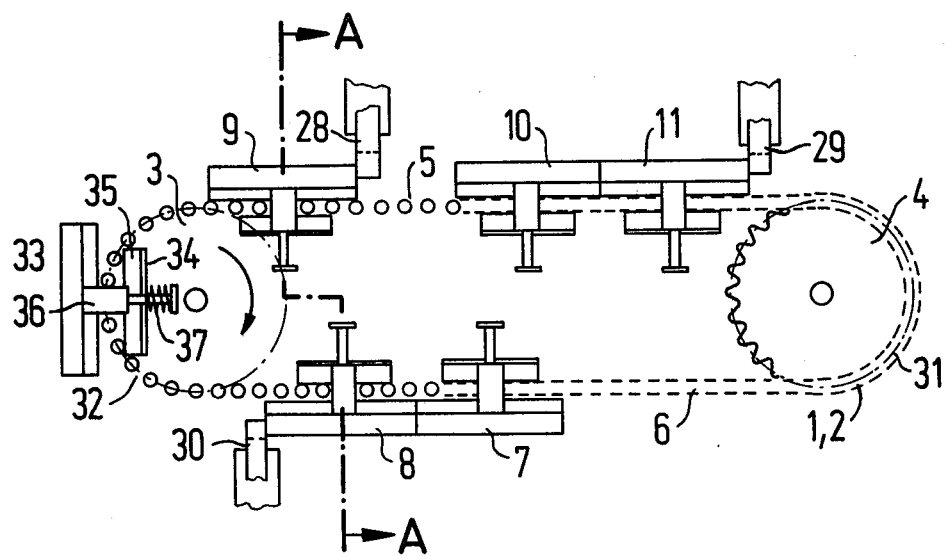
FIG. 1 shows a conveyor in which a latching device engages chordwise in a chain.

FIG. 1 shows a conveyor device to the extent that is of interest here. It includes two endless chains 1 and 2 disposed parallel with and next to one another, the front one of which alone is visible here. The two chains run over two chain sprockets 3 and 4 by which the two chains 1 and 2 are driven. Driving means for the sprockets are not shown, since they are of conventional design. Here the upper horizontal part of the chains constitutes an upper conveyor 5 and the lower horizontal part of the chains a lower conveyor 6. The two chains 1 and 2 move carriers 7 to 11, which each have a load plate 12 (see FIG. 2) for receiving the objects to be transported, which rest freely on the chains on two edge pieces 13 and 14. By virtue of friction building up between the edge pieces 13 and 14 and the chains 1 and 2 the carriers 7 to 11 are then moved forwards along the horizontal chain paths, i.e. along the upper conveyor 5 and the lower conveyor 6. The direction of movement is indicated by the arrow marked in the chain sprocket 3.

Figure 2:
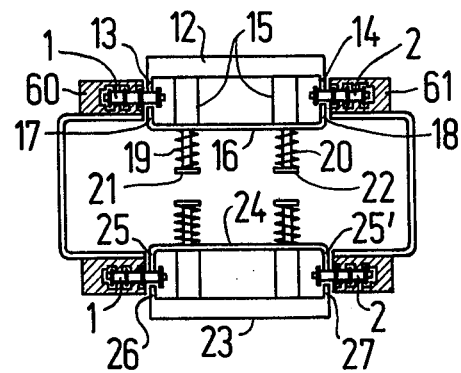
FIG. 2 shows the conveyor of FIG. 1 in section along the line A—A.

In FIG. 2, which shows a section along the line A—A of FIG. 1, the carriers are depicted in section. Supports 15, against which a U-rail 16 is pressed, are anchored to the plates 12. Here the U-rail lies against the ends of the supports 15 which are of such a length that the sides 17 and 18 of the U-rail 16 cannot come into contact with the chains 1 and 2 provided the carrier is being moved on the upper conveyor 5 in the manner of the carrier shown in FIG. 2 at the top of the device. Here the U-rail 16 is pressed against the supports 15 by means of the compression springs 19 and 20. The compression springs 19 and 20 are carried by setbolts 22 attached to the supports and passing through the U-rail 16. Thus the U-rail 16 forms a longitudinal rail extending along the chains 1 and 2 and held by the supports 15 with its sides 17 and 18 spaced from the edge pieces 13 and 14 so that the chains 1 and 2 have sufficient clearance from the sides 17 and 18.

Now when a carrier is moved forwards by the lower conveyor 6, it hangs, as FIG. 2 shows in connection with the carrier 23, with its U-rail 24 on the chains 1 and 2. Even in this position of the carrier the chains 1 and 2 have play between the sides 25 and 25' of the U-rail 24 and the edge pieces 26 and 27 of the carrier 23.

The two chains 1 and 2 are guided along the upper and the lower conveyors 5 and 6 in slides 60 and 61 from which the chains 1 and 2 partially project inwards so that they can support the carriers on their inner parts.

The result of the loose mounting of the carriers 7 to 11 as in FIG. 1 on the upper conveyor 5 and the lower conveyor 6 is that the carriers can be stopped by external means at any point on the upper conveyor 5 or lower conveyor 6, i.e. in the rectilinear parts of chains 1 and 2, the chains then sliding past either under the supporting plate 12 or under the U-rail 24 of the carrier concerned. In FIG. 1, three stops 28, 29 amd 30 are shown which can be moved hydraulically in order to either stand out of or in the path of the carriers 7 to 11. The latter position of the stops 28, 29 and 30 is shown in FIG. 1 in which one or two carriers 7 to 11 have come to rest before each stop. As can be seen, a plurality of carriers can accumulate before any one stop at any time, for example, the carriers 10 and 11 before the stop 29 and carriers 7 and 8 before stop 30. When a particular stop is retracted, the chains 1 and 2 can then move the associated carriers along once again by means of friction with the carrier.

For simplification of the illustration, the chains 1 and 2 are depicted in a shortened form in FIG. 1. The conveyor device as in FIG. 1 can be made to any desired length and fitted with stops at various points along the upper conveyor 5 and the lower conveyor 6, an accumulation zone for a corresponding number of carriers being created according to the length of the chains between two consecutive stops or between a stop and the preceding chain sprockets.

Therefore the device makes it possible to load carriers accumulating before a stop and then move these to a subsequent stop under the influence of the forward motion of the chains. A further accumulation may be formed if necessary, for example if the unloading rate of the objects conveyed by the carriers is temporarily less than the accumulation rate of carriers. In this way in particular workpieces can be moved from one machining station to another, the rate of loading or discharge of the workpieces being variable at the individual stops, at least where the accumulation of carriers allows this.

Now in order to move the carriers 7 to 11 safely in the area of the turn units 31 and 32, the U-rails 16 and 24 as in FIG. 2 have such a length that they bear against the chains 1 and 2, as these take up the shape of the turn units 31 and 32, from the inside like a chord (see FIG. 1) and thereby engage in the chains 1 and 2. This process can clearly be seen in FIG. 1 in which the carrier 33 is shown in the area of the turn unit 32, the U-rail 34 of the carrier resting with the ends of its side members 35 between the links of the chains 1 and 2. Here the U-rail 34 is pressed away from the supports 36 against the action of the spring 37, the spring 37 ensuring however that the side members 35 remain engaged with the chains 1 and 2. This process takes place in the area of both turn units 31 and 32; in each case as the carriers enter and leave the turn units the relevant U-rail is first slowly pushed away, engages thereby in the chains and finally, on reaching the other conveyor 5 or 6, moves towards the chains 1 and 2 again until the U-rails eventually re-adopt the position shown in FIG. 2. In this way it is guaranteed that a carrier passing in the area of a turn unit 31 or 32 is grasped and safely entrained by the chains 1 and 2 by means of its U-rail, through which the chains 1 and 2 themselves are used in a particularly advantageous manner to take over the task of lifting means to transfer the carriers from one conveyor to the other conveyor.

Figure 3:
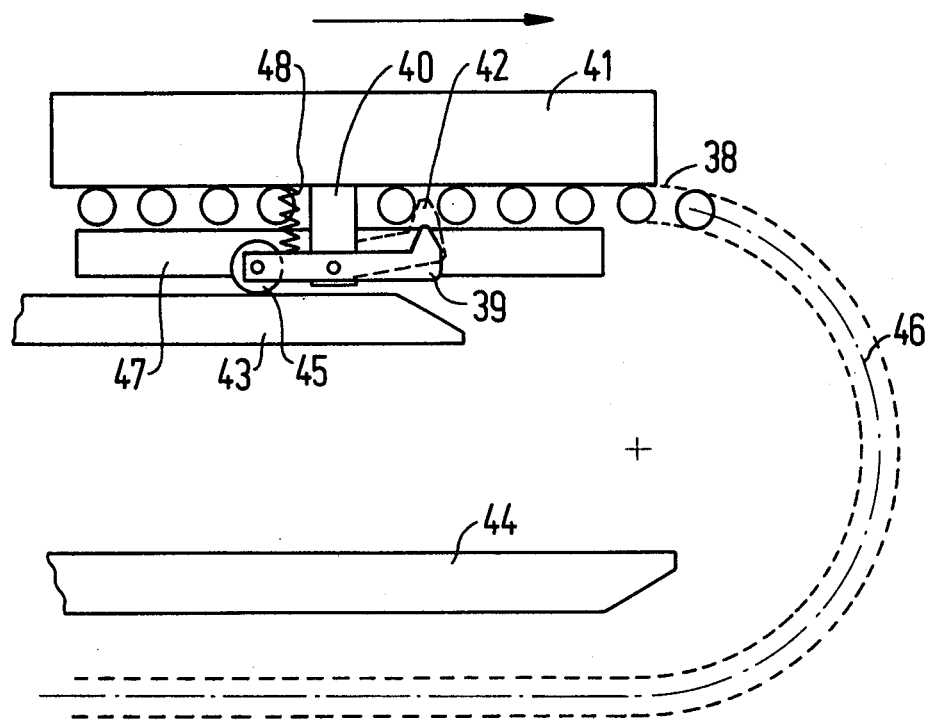
FIG. 3 shows a carrier member with a ratchet operated by means of a control rail.

In the case of the embodiment example depicted in FIG. 3, the carriers are entrained in the area of the turn units such as unit 46 by means of a ratchet 39 engaging in at least one chain 38. At its centre the ratchet 39 is pivotably mounted on the support 40 which is attached to the carrier 41. The ratchet 39 adopts the position indicated by the broken line with its nose 42 between two links in the chain 38 in the vicinity of the turn units. In the area of the straight sections of the chain 38, i.e. in the area of the upper and lower conveyors, control rails 43 and 44 are disposed adjacent the chain 38. A roller 45 mounted on the ratchet 39 runs over these rails and thereby removes the nose 42 of the ratchet 39 from the chain 38. As the carrier 41 moves along the upper or lower conveyor in a forwards direction the roller 45 moves over the control rails 43 and 44 with such a low amount of friction that this causes very little drag and the chain 38 is able to entrain the carrier. Then when the carrier 41 comes into the vicinity of the turn unit 46 (the same is true for the other turn unit), the roller 45 slides off the control rail 43 or 44 and the nose 42 assumes the position shown by the broken lines between two chain links as a result of which the carrier 41 is now safely entrained over the turn unit 46. On leaving the turn unit 46 the roller 45 re-engages with the control rail 44, causing the nose 42 to become disengaged from the chain 38 and the carrier 41 is suspended on a suspension element 47 in a similar way to that in FIG. 2 with the U-rails 16 and 24. Here the suspension element 47 is made to bend in a manner not shown so that no jamming can occur in the area of the turn unit 46 and the other turn unit which is not shown. The ratchet 39 is pressed with the roller 45 against the control rails 43 and 44 by the spring 48.

Figure 4:
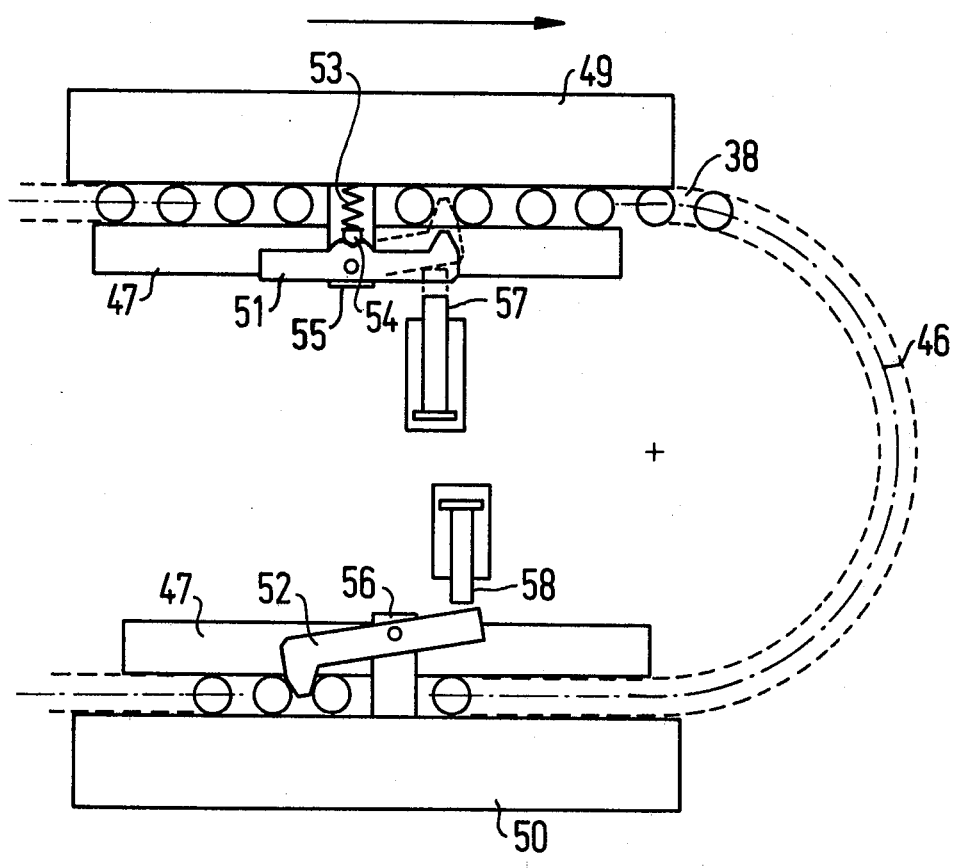
FIG. 4 shows a carrier with a ratchet operated by switching elements.

Another method of operating a ratchet is shown in FIG. 4. The chain 38 is shown again with the turn unit 46. The chain 38 supports the carriers 49 and 50 which are provided with respective ratchets 51 and 52 each lockable in both of two positions. The locking is effected in a manner shown here only in principle by means of a ball 54 acted upon by the spring 53, which ball engages in two corresponding recesses in the ratchet 51 or 52. The ratchet 51 is shown in the disengaged position, ratchet 52 in the engaged position. Here, to simplify the illustration in connection with the ratchet 52, its locking mechanism is omitted. At their centres the ratchets 51 and 52 are pivotably mounted on respective brackets 55 and 56 which are anchored to respective carriers 49 and 50. The actual switching of the ratchets 51 and 52 is effected by means of switching elements 57 and 58 which are operated hydraulically in a manner not shown. Here the switching element 57 is so disposed that before reaching the turn unit 46 it presses the ratchet 51 down towards the chain 38 so that the ratchet 51 engages in the chain 38. As a result of the locking of the ratchet 51 in this position the carrier 49 is then safely entrained during its passage around the turn unit 46 until it enters the zone of the other switching element 58 which is here shown resetting ratchet 52. The ratchets 51 and 52 are actuated in the manner of rockers by the switching elements 57 and 58. On reaching the lower conveyor, the ratchet 52 of the conveyor 50 is therefore reset so that from here on the carrier 50 hangs loosely on the chain 38 and is entrained by it. As in FIG. 3, the carrier 50 hangs on the suspension element 47 which is again capable of bending so that no possibility of the suspension element 47 becoming jammed with the chain 38 in the area of the turn unit 46 can arise.

The ratchets 51 and 52 can be operated by known means.

What we claim as our invention and desire to secure by Letters Patent of the United States is:

1. An endless conveyor comprising an endless chain forming a loop having two substantially rectilinear portions extending between two curvilinear portions;
   means for driving said endless chain; and
   a plurality of carriers on said chain, each being slidably mounted on said chain and frictionally transported thereby over said rectilinear portions;
   each carrier being provided with means including a spring-loaded unitary member for wedging between spaced apart links of said chain as said carrier passes from a rectilinear portion to a curvilinear portion of said chain.

2. An endless conveyor in accordance with claim 1 wherein each curvilinear portion is semicircular and the engaging means forms a straight, chord-like extension wedged between a plurality spaced apart links of said chain as the associated carrier passes from a rectilinear to a curvilinear portion of said chain.

3. An endless conveyor as defined in claim 2 wherein said endless chain is driven by a sprocket wheel.

4. An endless conveyor in accordance with claim 3 wherein said sprocket wheel drives a curvilinear portion of said chain.

5. An endless conveyor in accordance with claim 2 wherein said endless chain is driven by a sprocket wheel at each curvilinear portion thereof.

6. A conveyor as defined in claim 1 wherein two endless chains are provided and disposed in parallel alignment with said carrier members positioned suspended therebetween over the rectilinear portions thereof.

7. A conveyor as defined in claim 6 wherein a separate sprocket wheel drives each of said endless chains.

8. Apparatus as definded in claim 1 wherein each carrier comprises an inside and outside members which are spring loaded relative to one another to wedge one of the members between a plurality of spaced apart links as the carrier moves from a rectilinear to a curvilinear portion of said chain.

9. Apparatus as defined in claim 8 wherein the inside member is U-shaped and the side walls thereof are wedged between a plurality of spaced apart links as said carrier moves from a rectilinear to a curvilinear portion of said chain.

10. Apparatus as defined in claim 9 wherein the spring tension is adjusted to prevent contact of said inside member with said chain when suspended from said outside member over a rectilinear portion of said chain.

* * * * *